United States Patent

[11] 3,634,104

| [72] | Inventors | Milton Kaplow<br>White Plains;<br>Joseph J. Halik, Yonkers, both of N.Y. |
|---|---|---|
| [21] | Appl. No. | 758,679 |
| [22] | Filed | Sept. 10, 1968 |
| [45] | Patented | Jan. 11, 1972 |
| [73] | Assignee | General Foods Corporation<br>White Plains, N.Y. |

[54] MICROBIAL STABILIZATION OF COMBINED FOODS AND LIQUIDS
8 Claims, No Drawings

[52] U.S. Cl. .................................................... 99/204,
99/204, 99/157, 99/154
[51] Int. Cl. ........................................................ A23b 1/01,
A23b 1/04, A23b 7/02
[50] Field of Search............................................ 99/199,
204, 208, 124, 107, 104, 100, 154, 157

[56] References Cited
UNITED STATES PATENTS

| 2,420,517 | 5/1947 | Brandner.................... | 99/204 |
| 3,119,691 | 1/1964 | Ludington.................. | 99/124 |
| 3,202,514 | 8/1965 | Burgess...................... | 99/107 |

*Primary Examiner*—Norman Yudkoff
*Assistant Examiner*—Martin G. Mullen
*Attorneys*—Michael J. Quillinan and Thomas V. Sullivan ABSTRACT: A food product comprised of solid pieces of meat and/or vegetables intimately mixed within a liquid phase gravy or sauce is made microbiologically stable at nonrefrigerated storage conditions by infusing both the solids phase and surrounding aqueous liquid phase with stabilizing solutes to the extent of reducing the water activity of the solids phase to a level ranging from about 0.6 to about 0.9 and formulating the liquid phase with stabilizing solutes such that the water activity of the liquid phase differs from the water activity of the solids phase by less than 0.1.

3,634,104

MICROBIAL STABILIZATION OF COMBINED FOODS AND LIQUIDS

CROSS-REFERENCE TO RELATED APPLICATIONS

This application incorporates by reference copending applications Ser. Nos. 684,551 filed Nov. 20, 1967 for Food Processing and 684,952 filed Nov. 22, 1967 for Food Process and Product.

BRIEF SUMMARY OF THE INVENTION

The invention herein described was made in the course of and under a contract with the U.S. Army Natick Laboratories.

This invention relates to micro-organically stable, intimately mixed food products wherein animal or plant materials are intimately combined with an organoleptically compatible liquid, the food product being intended for nonrefrigerated storage and for consumption as such or for consumption in a more hydrated form. More specifically, the invention is concerned with the art of stabilizing such products as meat cuts and/or plant material like beef and/or vegetables, potatoes, carrots or peas which are rendered shelf stable for nonrefrigerated distribution and yet are compatibly combined with an aqueous liquid having sauce or gravy characteristics which edify the liquid with desirable fat and/or thickened flavor and aroma values.

Troop rations should be desirably self-preserving and thus lend themselves to consumption under field conditions. The ration as eaten should be consumable "as is" or should lend itself to consumption simply by warming to a desired degree. While troop rations may be canned by commercial sterilization techniques, it would be desirable to have such a ration packaged more inexpensively, and in any event in a packaging material which is readily openable such as a flexible pouch-forming plastic. The food product should be compact, of lightweight and low moisture and yet offer the desired caloric value required to sustain human metabolism. Ideally the product should impart a high practical level of caloric value compatible with organoleptic acceptability. Such a compact product should nevertheless offer identifiable food values such as color and shape representative of the food to be eaten.

It is an object of the present invention to provide a product meeting the foregoing troop ration specifications in a form wherein the food solids, be they animal tissue or plant tissue or mixtures thereof, are flavorfully combined with aqueous liquid preparations identifiable as sauces and/or gravies. The object of the present invention illustratively stated is provision of a foodstuff as a stew in a substantially pathogen-free form which can be packed either anaerobically or aerobically and which can be transported to and in the field of combat without refrigeration. Still another object of the invention is to provide a troop ration which is readily stored and consumed in a variety of field conditions, be they tropical or artic, and which would desirably retain the intended organoleptic food values under such a wide range of combat conditions. A most specific object of the invention is to provide a food ration consisting of food solids and liquids which may be consumed as is in the field even under the most unideal artic conditions and will offer desired chewiness, softness and moistness as consumed, or will at least approach the product target to a greater extent than products of the known art.

Briefly stated the present invention involves infusion of a polyhydric alcohol within a food solid matrix in any one of a variety of degrees of subdivision and the formulation of distinct aqueous liquid also containing a polyhydric alcohol, said food solid and said aqueous liquid having moisture contents usually less than 40 percent respectively and having a total concentration of water soluble compounds respectively whereat the two dissimilar phases are anaerobically or aerobically stable depending upon the packaging techniques intended, it being a further feature of this invention that the respective water activities in the food solids and liquid phases are so related one to another that they equilibrate to one another during storage and retain their micro-organic stability.

Thus, in a typical embodiment of the present invention a beef stew is formulated to contain beef chunks and whole or subdivided carrots, peas and potatoes, each of which are respectively dehydrated to a moisture content less than 50 percent and more ideally less than 45 percent through the infusion therein of a stabilizing solute containing a polyhydric alcohol such as glycerol; a "gravy" is formulated as an aqueous liquid containing a suitably emulsified fat and thickening colloid together with edifying flavorants, colorings, spices and the like—which gravy is also of a moisture content less than 45 percent but has, as plasticizing solute therein, a significant level of polyhydric alcohols like glycerol serving to provide a flowable plastic or at least semiplastic fluidity under the anticipated conditions of use be they of ambient temperate climates or artic conditions. The respective water activities of the dehydrated food solids phase and the liquid phase will be such that migration of aqueous fluids from one phase to the other will not result in a substantial change in the relative concentration of stabilizing solutes in the respective phases and commonly the level of soluble solids and moisture present in the solid phase and the liquid phase will substantially approximate one another such that any moisture migration that may occur incident to storage of the packaged foodstuff will be minimal and in any event will not adversely imbalance the concentration of stabilizing solutes in the food solid phase and the liquid phase.

DETAILED DESCRIPTION OF THE INVENTION

Generally the food solid phase will be "dehydrated" as that term is to be understood herein to a moisture level in the range between 20 and 45 percent whereat maximum organoleptic acceptability and food solid plasticity are provided, it being understood that the term dehydrated in the present instance applies to the comparative moisture level of the food solid relative to its hydrated condition in either the pristine or cooked state. Thus, it is within the ambit of the present invention that raw plant tissue or animal tissue may be dehydrated from a moisture content in excess of 60 percent to a moisture level of 20 to 50 percent whereat acceptable chewiness and food plasticity are provided or the food solid may have been previously dehydrated to below 20 percent moisture but will be rehydrated to this stated range and as rehydrated will similarly provide the desired eating qualities intended, the latter rehydrated condition being comparatively one of dehydration vis a vis the "raw" or "cooked" condition of the food solid as it is normally available or prepared.

To explain further, vegetables such as carrots or peas in the raw form may be blanched and further cooked and eventually dehydrated from a moisture level of say in excess of 75 percent to a moisture level well below 50 percent by infusion of such produce with a stabilizing solution containing a high level of glycerol and other stabilizing solutes whereby the major portion of the food moisture present will undergo transfer from the food solid phase to the stabilizing solution in exchange for stabilizing solutes contained in said solution; this technique will preferably call for procedures more fully set forth in copending application, Ser. No. 684,551 filed Nov. 20, 1967 by Milton Kaplow and Joseph Halik entitled Food Process; in accordance with the teachings of that application foodstuffs having a moisture content in excess of 50 percent are stabilized by immersing them in a cooking solution containing at least 5 percent polyhydric alcohol and preferably high in concentration of other stabilizing solutes selected from the class consisting of sugars, salts and mixtures thereof. The food is preferably treated in this solution for a sufficient period of time to at least thermally deactivate any latent enzymatic and pathogenic activity. The solution is used in an excess amount sufficient to permit immersion cooking of the foodstuff and cause it to undergo a water substitution by the stabilizing solution; in this manner the stabilizing solute, including the polyhydric alcohol, replaces a substantial and usually a major percent of the original moisture content of the food.

As an alternative process of "dehydration" in accordance with the precepts of the present invention, food solids are converted to a semimoist stabilized condition typically from a freeze dried state and are adjusted upwardly to a moisture content in excess of 20 percent by infusing the produce with an aqueous stabilizing solution containing a polyhydric alcohol whereby the moisture level of the produce has ultimately a moisture content between 20 and 50 percent and is caused to contain a level of polyhydric alcohol generally in excess of 5 percent of the weight of total water soluble solids present in the produce; this "dehydrated" condition in the ultimately stabilized foodstuff is understood to appertain by reason of the comparative moisture content of the foodstuff vis-a-vis that moisture content which is possessed in its pristine or cooked condition which generally is in excess of 60 percent and commonly is in excess of 70 percent. Foods "dehydrated" in accordance with this latter technique are treated commonly in accordance with the teaching set forth in copending application, Ser. No. 684,952 filed Nov. 22, 1967 by Milton Kaplow and Joseph Halik entitled Food Process and Product. In general, foods in a substantially desiccated condition, e.g., ones having a moisture content less than 20 percent and commonly less than 10 percent, are caused to be infused by a high concentration of solutes in solution which solutes preferably and ideally contain a plasticizing polyhydric alcohol such as glycerol in the amount stated herein, whereby the foodstuff in an at least pasteurized and preferably fully cooked state is uniformly infused so that the animal tissue or vegetable tissue, typically beef or carrots and peas as illustrated hereinabove, have their morphology uniformly infused with a high concentration of stabilizing solutes sufficient to increase the osmotic pressure of the aqueous solution created therein.

For the purposes of the present specification the teachings of the aforesaid Kaplow et al., applications identified are incorporated by reference herein and are to be fully considered as having been adopted by applicants herein as part of the teachings of their invention, it being understood, however, that the concentration of stabilizing solutes in all instances must be so rectified as to be in proximate water activity balance with the stabilized aqueous liquids surrounding the foodstuff as will be described hereinafter.

The aqueous liquid, be it a gravy or sauce, depending upon the condiments added thereto and the flavor intended, will commonly have a significant level of fat and thickening colloids such as starch, dextrins or flour together with seasonings, coloring, spices and the like and will be formulated to be in an essentially flowable liquid state under ambient conditions, under temperate climes and where artic conditions are contemplated. Said aqueous phase will also be essentially plastic and to a large extent flowable or spoonable under such environments. To formulate such a stable, aqueous liquid, a significant level of polyhydric alcohol, typical of which will be glycerol, as well as salt and/or sugar compatible with flavor will be placed in solutions in the aqueous media which will generally range in moisture content from 20 to 40 percent content and be less than 45 percent by weight of the total sauce or gravy in the composite of liquid and solids as packed in ration form.

Water activity of the respective food solids and liquid phases described herein will be predetermined in order that the phases will provide requisite bacteria-static and overall micro-organic stability under the anticipated conditions of treatment preparatory to packaging, during packaging and during storage. Such stability determination will be made by formulating the respective solid and liquid phases so as to provide a desired $A_w$, i.e., the relative humidity of a headspace atmosphere in equilibrium with the food or liquid, $A_w$ being customarily expressed as a decimal fraction of one and being so expressed herein and said atmosphere being understood to be that sensed by a hygrometer in a substantially hermetically sealed chamber. Thus, the $A_w$ can be determined by inserting the specimen in an airtight jar and after storage for a suitable period of 24 hours to assure equilibrium, the relative humidity of the air or headspace in the jar will be measured using a hydrometer.

For most applications contemplated herein, the respective solid and liquid phases will both have $A_w$'s of 0.60 to 0.90, the specific $A_w$ of use being dependent on the nature of the food and liquid phase primarily. Generally, it will be preferred to formulate such phases at an $A_w$ above 0.75 inasmuch as most foods are more flavorful and organoleptically acceptable at the higher $A_w$. On the other hand, as one approaches the upper part of the range, it becomes more difficult to consistently preserve the particular solid and liquid phases, and so most products will cautiously have an $A_w$ less than about 0.85. The $A_w$'s to which the respective solid and liquid phases are adjusted during formulation and infusion prior to packaging will be such that upon packaging any equilibration that may take place between the respective phases due to imbalance of $A_w$ will not detract from organoleptic acceptability and stability. In most food applications in accordance with this invention it has been found that the food solid phase and the liquid phase can be formulated prior to packaging at an $A_w$ wherein the respective phases substantially approximate one another or, in any event, do not deviate from one another by more than 0.10 and more commonly by no more than 0.05. On the other hand, the invention is not to be restricted to such a practice inasmuch as some food applications may involve the formulation of food solid and liquid phases having a wider deviation of $A_w$ and which readjust with one another to the desired range. The most preferred range of $A_w$ for the respective food phases as packaged upon achieving such equilibration will be 0.80 to 0.85 with care being exercised at the upper water activity factor against possible instability.

The solid and liquid phases will preferably be separately infused and formulated to achieve the desired pasteurization or sterilization as well as $A_w$ rectification by solute infusion, but the invention may also be practiced by effecting rectification of both the solid and liquid phases in the presence of one another. For most applications the food solid will have the desired stabilizing solutes infused therein by immersion so as to cause dehydration from the raw state to less than 50 percent by transfer with the infusing solution. Collateral to this stabilization the liquid to be admixed with this food solid will be formulated separately and caused to have the desired level of stabilizing solutes also in the aforestated reduced moisture range. On the other hand, it is within the ambit of this invention to employ the infusing solution as the liquid phase such as by rectification of the solids and moisture content of the infusing solution after it has been employed to cause "dehydration" of the food solid.

The invention will be found to be applicable to the formulation of such products as beef, lamb and meat and vegetable stews generally as well as casserole preparations involving meat and/or fish in admixture with vegetables and grains such as rice and/or pasta foods such as noodles, macaroni in various shapes. The liquid phase will be so formulated as to have the desired rheological characteristics compatible with food acceptability. In most applications, the gravy or sauce will be fluid but comparatively plastic or thickened in character. The liquid phase will, thus, be formulated to contain fat and/or colloids such as starches, dextrins, flour, as well as the condiments or spices and the water.

Customarily, it will be found practical to pasteurize the food solids phase by infusion at an elevated temperature, say in excess of 160° F., the pasteurization being carried out sufficiently to at least kill any pathogens or inactivate enzyme; a common range of immersion heating temperatures will be 180° F. to 210° F. for 15 to 25 minutes depending upon desired product texture of the food solids phase.

In the case of the liquid phase prolonged heat treatment may be less critical and usually any heat treatment will be employed that is sufficient to promote fluidity in the admixture of the fat and/or thickness with the aqueous and other liquids in the medium; thus, it may be desirable to elevate the temperature of the liquid to melt the fatty constituents thereof and to promote sufficient emulsification to assure physical stability and minimize segregation of the aqueous and nonaqueous phases of the liquid.

As distinguished from canned stew and like preparations of the prior art, the compositions of the present invention are intended to be packaged without commercial sterilization and advantageously may be cooled to subpasteurization temperatures prior to packaging, say to temperatures below 180° F. thereby allowing greater manufacturing flexibility and a less expensive substantially nonhermetic package. On the other hand, it is not intended to foreclose the practice of hermetic packaging, or at least, combining the food solid and liquid phases at above pasteurization temperatures. Likewise, the invention may be practiced to advantage by use of hermetic anaerobic packaging, the food solid and liquid phases being at subpasteurization temperatures and the composition being thereby preserved in an oxygen-free atmosphere whereby rancidity, color changes and light decomposition are avoided, or at least reduced. In all of the foregoing packaging applications, by virtue of the built-in microbial stability, leaks, pinholes or minor imperfections in packaging material, such as may be caused in handling, will not give rise to spoilage. The ration, of course, will be of lighter weight, not only due to the concentration of the foods per se, but also due to use of lighter packaging materials such as polyethylene-coated foil and the like, which packaging materials are also flexible and lend themselves to a wider variety of shapes and sizes depending upon ration packaging requirements.

The invention will now be more fully described by reference to the accompanying operative examples.

EXAMPLE I

Beef Stew with Gravy

A beef stew with gravy was formulated from the following individual constituents:

LIQUID PHASE

GRAVY FORMULATION

| Ingredients | % |
| --- | --- |
| Corn Syrup Solids | 34.95 |
| Coconut Oil (76° F. congeal point) | 30.00 |
| Water | 17.00 |
| Glycerol | 10.00 |
| Seasonings & Salt | 4.00 |
| Propylene Glycol | 2.00 |
| Pregelatinized Potato Starch | 1.00 |
| Beef Flavor | 0.50 |
| Potassium Sorbate | 0.30 |
| Mono- and di-glycerides | 0.25 |
| | 100.00 |
| Moisture Content = | 17.4 (Vacuum-Oven Method) |
| $A_w=$ | 0.79 |

The gravy phase was prepared simply by warming to above the congeal point of the fat and blending in a mixer.

Food Solid Phase

Fresh green peas were immersion cooked in the manner set forth in aforesaid Kaplow et al., application, Ser. No. 684,551; the peas were immersed in the infusing solution for 10 minutes, the infusion solution being at a temperature of 208° F., whereafter the peas were allowed to soak overnight and were withdrawn.

The following was the weight constituency of the peas and infusion solution

| Peas, Fresh, Shelled | % | Grams |
| --- | --- | --- |
| Solids | 22.0 | 277.2 |
| Moisture | 78.0 | 982.8 |
| Total | 100.0 | 1,260.0 |
| Infusion Solution | | |
| Glycerol | 78.4 | 1,143.0 |
| Water | 11.0 | 160.5 |
| Sodium Chloride | 6.2 | 90.0 |
| Propylene Glycol | 4.1 | 60.0 |
| Potassium Sorbate | 0.3 | 4.5 |
| Total | 100.0 | 1,458.0 |
| Moisture Content = | 39.4 (Vacuum-Oven Method) | |
| $A_w=$ | 0.80 | |

Fresh carrots, cubed beef and potatoes were infused by a like stabilizing solution using infusing conditions similar to those set forth hereinabove and in said Kaplow application for the peas, the cooking time for respective food solids was that at which optimal organic acceptability is afforded; the cubed beef was cooked for 10–15 minutes as were the potatoes and the carrots.

The following are the formulas for infusing constituents for treating the carrots, beef and potatoes:

Fresh Raw Carrot Dices (One-fourth–one-half inch)

| Carrots, Peeled, Trimmed | % | Grams |
| --- | --- | --- |
| Solids | 11.0 | 275 |
| Moisture | 89.0 | 2,225 |
| Total | 100.0 | 2,500 |
| Infusion Solution | | |
| Glycerol | 88.7 | 3,155 |
| Water | 5.5 | 197 |
| Sodium Chloride | 3.7 | 130 |
| Propylene Glycol | 1.6 | 56 |
| Potassium Sorbate | 0.5 | 19 |
| Total | 100.0 | 3,557 |
| Moisture Content = | 35.7 (Vacuum-Oven Method) | |
| $A_w=$ | 0.71 | |

| Beef, Cubed Chuck | % | Grams |
| --- | --- | --- |
| Solids | 35.0 | 1,617.0 |
| Moisture | 65.0 | 3,003.0 |
| Total | 100.0 | 4,620.0 |
| Infusion Solution | | |
| Glycerol | 56.6 | 2,112.0 |
| Seasonings | 19.8 | 739.2 |
| Water | 8.0 | 300.0 |
| Sodium Chloride | 7.4 | 277.2 |
| Propylene Glycol | 7.1 | 264.0 |
| Potassium Sorbate | 1.1 | 39.6 |
| Total | 100.0 | 3,732.0 |
| Moisture Content = | 31.0 (Vacuum-Oven Method) | |
| $A_w=$ | 0.77 | |

Fresh Raw Potato Pieces (One-half–three-fourths inch)

| Potatoes, Peeled, Diced | % | Grams |
| --- | --- | --- |
| Solids | 20.0 | 1,000.0 |
| Moisture | 80.0 | 4,000.0 |
| Total | 100.0 | 5,000.0 |
| Infusion Solution | | |
| Glycerol | 80.4 | 4,687.5 |
| Water | 10.4 | 610.0 |
| Sodium Chloride | 4.3 | 250.0 |
| Propylene Glycol | 4.3 | 250.0 |
| Potassium Sorbate | 0.6 | 37.5 |
| Total | 100.0 | 5,835.0 |
| Moisture Content = | 36.8 (Vacuum-Oven Method) | |
| $A_w=$ | 0.79 | |

Composite Beef Stew with Gravy and Food Solids Phases

| | % |
| --- | --- |
| Infused Gravy | 50.0 |
| Infused Potato Pieces | 20.0 |
| Infused Beef Pieces | 15.0 |
| Infused Carrot Dices | 7.5 |
| Infused Peas | 7.5 |
| Total | 100.0 |
| Moisture Content = | 26.2 (Vacuum-Oven Method) |
| $A_w=$ | 0.78 |

The foregoing food solids and the gravy phases were simply mixed, mixing being carried out in a Hobart blender until a uniform distribution of solid and liquid phases was achieved. In composite, the stew is a spoonable plastic aggregation which can be stored as such under ambient room temperatures preparatory to packaging or may be packaged directly from the mixer using aerobic, subpasteurization temperatures. Preferably, the composite will be cold packed in a flexible pouch and heat-sealed in a gaseous nitrogen atmosphere.

EXAMPLE II

Chicken a la King

A chicken a la king preparation was formulated as follows:

| Ingredient | % | $A_w$ | % Moisture |
| --- | --- | --- | --- |
| Cream Sauce | 53.8 | 0.855 | 19.6 |
| Chicken | 41.0 | 0.836 | 37.6 |
| Mushrooms | 2.60 | 0.823 | 38.6 |
| Pimento | 1.34 | 0.850 | 25.7 |
| Peppers | 1.26 | 0.820 | 39.2 |
| Approx. Overall $A_w$ of Casserole | | | = 0.845 |
| Approx. Overall % Moisture of Casserole | | | = 31.2% |

The sauce for the chicken a la king casserole was prepared from the following list of ingredients:

| Sauce Ingredients | % |
| --- | --- |
| Cottonseed oil | 39.35 |
| Water | 14.10 |
| Nonfat dry skim milk | 12.75 |
| Glycerol | 11.75 |
| Cottonseed oil (76° F. congeal point) | 7.87 |
| Whole egg yolk | 10.00 |
| Corn syrup solids | 2.00 |
| Salt | 1.00 |
| Mono- and di-glyceride | 0.90 |
| Potassium Sorbate | 0.30 |
| Total | 100.00 |

The sauce ingredients were combined essentially in accordance with the procedure set forth for the gravy constituents in example I above. The following are the formulations for the respective infusion solutions and the ratios thereof to the chicken, mushrooms, pimento and peppers infused.

INFUSING SOLUTIONS FOR VARIOUS VEGETABLES AND CHICKEN

| | Canned, drained pimento pieces[1] | Canned mushroom slices[2] | Fresh, green trimmed peppers[3] | Raw, trimmed white meat chicken[4] |
| --- | --- | --- | --- | --- |
| Weight of material, gm. | 334 | 226 | 673 | 1,928 |
| Ingredients of infusing solution, percent: | | | | |
|   Glycerol | 66.6 | 64.6 | 67.8 | 39.70 |
|   Water | 24.9 | 31.7 | 25.7 | 45.05 |
|   Sodium chloride | 4.8 | 3.2 | 6.0 | 4.50 |
|   Seasoning | | | | 10.10 |
|   Propylene glycol | 3.2 | | | |
|   Potassium sorbate | 0.5 | 0.5 | 0.5 | 0.65 |
| Weight of solution, gm | 634 | 482.7 | 1,276.1 | 3,864.7 |
| Infused product: | | | | |
|   Percent moisture | 43.4 | 46.8 | 42.0 | 42.6 |
|   $A_w$ | 0.85 | 0.83 | 0.82 | 0.836 |

[1] 7.6% solids, 92.4% water.
[2] 12.8% solids, 87.2% water.
[3] 6.8% solids, 93.2% water.
[4] 26.3% solids, 73.7% water.

The chicken was infused to the tabulated moisture content and $A_w$ using an infusion solution and procedure substantially as set forth hereinabove in respect to example I for the cubed beef.

The mushrooms, pimentos and peppers were blanched in a customary manner to deactivate the enzymes therein by immersion in water and cooking for a period of from 2 to 5 minutes at 200° F., whereafter the blanched vegetables were soaked in an infusion solution like that set forth for infusing the peas or carrots and until the desired $A_w$ and percent moisture listed in respect of the chicken a la king constituents above was obtained, soaking being employed for a period of 24–4 hours.

The sauce and food solids of the chicken a la king formulation were admixed and packaged as illustrated in respect of the stew or operative example I.

EXAMPLE III

Ham in Cream sauce

Ham in cream sauce was prepared as follows:

| Ingredient | % | $A_w$ | Moisture |
| --- | --- | --- | --- |
| Cream Sauce | 60.0 | 0.860 | 19.8 |
| Ham | 40.0 | 0.850 | 46.1 |
| | 100.0 | | |
| Approx. overall $A_w$ of Casserole | | | = 0.862 |
| Approx. overall % Moisture of Casserole | | | = 34.6% |

A cream sauce was prepared having the following formulation:

| Infusion Solution Ingredients | Weight % |
| --- | --- |
| Winterized cotton seed oil | 39.75 |
| Water | 14.25 |
| Nonfat dry skimmed milk | 12.80 |
| Glycerol | 9.83 |
| Cottonseed oil (76° F. congeal point) | 7.97 |
| Whole egg yolk | 10.00 |
| Corn syrup solids | 2.10 |
| Propylene glycol | 2.00 |
| NaCl | 1.00 |
| Potassium sorbate | 0.30 |
| Total | 100.00% |

The sauce was prepared in a manner like that employed to prepare the sauce in example II and the gravy in example I as aforesaid.

The sliced ham which had been precooked was simply soakinfused in stabilizing solutes using the cubed beef stabilizing solution and procedure as before until the stated percent moisture and resulting $A_w$ was achieved. The infusion occurring over a period of from 24–48 hours as before.

The ham and cream sauce preparations were packaged in the same procedure as set forth for example I.

The package preparations of examples I, II and III offer a microbial stability for all of the anticipated ration requirements therefor. The products are respectively formulated to be eaten as is or with additional water. The preparations can be eaten cold as well as warm. The product can be eaten under a range of storage temperatures and will be admirably suited to consumption under Artic conditions as well as temperate climes. The compositions essentially withstand storage with no significant changes in their organoleptic values such as sauce or gravy stability or color or flavor changes in the food solids.

While the invention has been described by reference to certain illustrative examples, it will be understood that they are subject to variations to suit taste, appearance and overall organoleptic acceptance. Generally, the ratio of sauce or gravy liquid phase to the food solid phase will be in the neighborhood of equal weights, with the ratio of the respective phases one to the other varying in weight percent between a range of 0–25 percent from an equal weight relationship. Thus, the liquid phase may be anywhere from 25–150 percent by weight of the total admixture of food solids phase and liquid phases.

It will be understood that the stabilizing solutes of use for both the food solids phase and the liquid phase will preferably contain such polyhydric alcohols as glycerol, sorbitol or manitol or mixtures thereof, glycerol being the most preferred. Propylene glycol may also be employed as a polyhydric alcohol, although its use level should be reduced below 2 percent. The term "polyhydric alcohol" is to be understood as coextensive with that term as employed in the aforesaid pending Kaplow, et al., application Ser. No. 684,551 as set forth on pages 6, 7 and 8 thereof. The terms "sugar" and "salt" will also be understood to be coextensive with the illustrations for those compounds listed on pages 12 and 13 of said latter Kaplow, et al., application.

Reference should be had to the appended claims for a definition of the scope of the invention.

What is claimed is:

1. A process for imparting micro-organic stability to a spoonable intimately mixed food product, such as a beef stew, intended for nonrefrigerated storage consisting essentially of a solids phase selected from the group consisting of meat pieces, vegetables and mixtures thereof combined with an aqueous liquid phase selected from the group consisting of gravy and sauce which comprises:
   a. infusing the solids phase with an effective concentration of micro-organically stabilizing solutes selected from the group consisting of sugars, salts, sorbitol, glycerol, propylene glycol and mixtures thereof to produce a solids phase having a moisture content ranging from about 20 percent to about 40 percent by weight of the solids phase and to establish a solids phase $A_{w}$ of about 0.60 to about 0.90;
   b. independently from the infused solids phase, formulating the aqueous liquid phase to contain an effective level of micro-organically stabilizing solutes selected from the group consisting of sugars, salts, glycerol, sorbitol, propylene glycol and mixtures thereof to establish an aqueous liquid phase having a moisture content of 20 to 40 percent and an $A_{w}$ which differs by less than 0.1 from the $A_{w}$ of the solids phase;
   c. combining said infused solids phase with said aqueous liquid phase by intimately mixing the respective phases; and
   d. packaging said mixed phases in a substantially moisture impermeable container whereby moisture migration between said phases is minimal.

2. A process according to claim 1 wherein the liquid phase is formulated to contain a fat.

3. A process according to claim 1 wherein the liquid phase is formulated to contain a colloid selected from the group consisting of starch, dextrin, flour and mixtures thereof.

4. The process according to claim 1 wherein the food product contains an antimycotic agent.

5. The process according to claim 4, wherein the antimycotic agent is potassium sorbate.

6. The process according to claim 1 wherein the solids phase has an $A_{w}$ ranging from about 0.75 to about 0.85 and the $A_{w}$ of the liquid phase differs in value from the $A_{w}$ of the solid phase by less than 0.05.

7. A spoonable food composition having micro-organic stability when stored in a substantially moisture impermeable package at nonrefrigerated temperature conditions which comprises:
   a. a solids phase comprised of food pieces selected from the group consisting of meat pieces, vegetable pieces and mixtures thereof infused with micro-organically stabilizing solutes selected from the group consisting of sugars, salts, glycerol, propylene glycol, sorbitol and mixtures thereof to the extent whereof the moisture content of the solids phase is 20 to 45 percent by weight of the food pieces and the solids phase water activity ranges from about 0.60 to about 0.90, said solids phase intimately mixed with and immersed in
   b. an aqueous liquid phase selected from the group consisting of gravy and sauce, said aqueous liquid phase having a level of solutes selected from the group consisting of sugars, salts, glycerol, propylene glycol, sorbitol and mixtures thereof which impart to the aqueous liquid phase a moisture content of 20 to 40 percent and a water activity which differs by less than 0.1 from the water activity of the solids phase.

8. A spoonable food product according to claim 7 wherein the solids phase water activity ranges from about 0.75 to about 0.85 and the aqueous liquid phase water activity differs by less than 0.05 from the water activity of the solids phase.

* * * * *

UNITED STATES PATENT OFFICE
CERTIFICATE OF CORRECTION

Patent No. 3,634,104            Dated January 11, 1972

Inventor(s) Milton Kaplow and Joseph J. Halik

It is certified that error appears in the above-identified patent and that said Letters Patent are hereby corrected as shown below:

Column 8, Line 6, change "24-4 hours" to ---24-48 hours---.

Column 9, Line 25, change "40 percent" to ---45 percent---.

Signed and sealed this 30th day of May 1972.

(SEAL)
Attest:

EDWARD M. FLETCHER, JR.
Attesting Officer

ROBERT GOTTSCHALK
Commissioner of Patents